US006732984B2

United States Patent
Tsai

(10) Patent No.: US 6,732,984 B2
(45) Date of Patent: May 11, 2004

(54) SUPPORT APPARATUS

(76) Inventor: David Tsai, No. 113-9, Gin-Chen Street, Chang Hua City (TW)

( * ) Notice: Subject to any disclaimer, the term of this patent is extended or adjusted under 35 U.S.C. 154(b) by 6 days.

(21) Appl. No.: 10/156,108

(22) Filed: May 29, 2002

(65) Prior Publication Data
US 2003/0222191 A1 Dec. 4, 2003

(51) Int. Cl.[7] ............................................. F16M 11/00
(52) U.S. Cl. ................. 248/125.1; 248/161; 248/354.1; 211/17
(58) Field of Search ........................... 248/354.1, 125.1, 248/125.2, 125.3, 125.8, 161; 211/17, 18, 19, 20, 21, 22; 224/924, 42.12, 42.13, 42.26, 549

(56) References Cited

U.S. PATENT DOCUMENTS

| 4,572,557 A | * | 2/1986 | Taylor ......................... 292/263 |
| 4,813,550 A | * | 3/1989 | Saeks ........................... 211/17 |
| 5,083,729 A | * | 1/1992 | Saeks et al. ................... 211/22 |
| 5,092,504 A | * | 3/1992 | Hannes et al. ........ 224/42.45 R |
| 5,127,564 A | * | 7/1992 | Romero ............... 224/42.45 R |
| 5,174,531 A | * | 12/1992 | Perakis ....................... 248/124 |
| 5,664,687 A | * | 9/1997 | Liatti ............................ 211/17 |
| 5,730,345 A | * | 3/1998 | Yeckley et al. .............. 224/505 |
| 5,772,048 A | * | 6/1998 | Sopcisak ...................... 211/20 |
| 6,062,451 A | * | 5/2000 | Lassanske et al. .......... 224/502 |
| 6,095,344 A | * | 8/2000 | White .......................... 211/17 |
| 6,131,638 A | * | 10/2000 | Levin ........................... 160/80 |
| 6,305,117 B1 | * | 10/2001 | Hales, Sr. ...................... 42/94 |

* cited by examiner

Primary Examiner—Korie Chan
Assistant Examiner—Steven Marsh
(74) Attorney, Agent, or Firm—Rosenberg, Klein & Lee

(57) ABSTRACT

A support apparatus includes a first tube, a second tube pivotally connected with the first tube, a rod telescopically connected with the first tube and a positioning device for retaining the rod in position relative to the first tube. The positioning device includes a mount secured to the first tube and a latch movably mounted on the mount between an engaging position where the latch engages with the rod and a releasing position where the latch releases the rod. The mount includes two lateral portions secured to the first tube. The latch is pivotally mounted on the lateral portions of the mount. Each of the lateral portions of the mount defines an aperture. The latch defines an aperture. A bolt is inserted through the aperture defined in each of the lateral portions of the mount and the aperture defined in the latch. The mount includes an intermediate portion formed between the lateral portions. A spring is arranged between the intermediate portion of the mount and the latch for retaining the latch in the engaging position. The latch includes a first section for engagement with the rod and a second section to be operated so as to move the latch between the engaging and releasing positions. The rod includes a series of teeth. The first section of the latch includes at least one tooth formed thereon for engagement with at least one of the teeth formed on the rod in the engaging position.

20 Claims, 7 Drawing Sheets

SUPPORT APPARATUS

BACKGROUND OF INVENTION

1. Field of Invention

The present invention is related to a support apparatus.

2. Related Prior Art

Taiwanese Patent Publication No. 465688 teaches a positioning device for elements movable relative to each other. In specific, the elements movable relative to each other are a first tube and a second tube for insertion in the first tube. The positioning device includes a clamp and a bolt. The clamp includes an internal face consisting of a first section for receiving the first tube and a second section for receiving the second tube. The clamp includes two separate claws each defining an aperture for receiving the bolt. The bolt can be engaged with a nut in order to move the claws toward to each other. Thus, the first and second tubes are retained in position by means of the positioning device. However, the positioning device cannot help the tubes be adjusted to an adequate length for tight abutment against two surfaces The present invention is therefore intended to obviate or at least alleviate the problems encountered in prior art.

SUMMARY OF INVENTION

It is the primary objective of the present invention to provide a support apparatus capable of tight abutment against two surfaces.

The present invention provides a support apparatus with a first tube, a second tube pivotally connected with the first tube, a rod telescopically connected with the first tube and a positioning device for retaining the rod in position relative to the first tube.

The positioning device includes a mount secured to the first tube and a latch movably mounted on the mount between an engaging position where the latch engages with the rod and a releasing position where the latch releases the rod.

The mount includes two lateral portions secured to the first tube. The latch is pivotally mounted on the lateral portions of the mount.

The support apparatus includes a bolt. Each of the lateral portions of the mount defines an aperture. The latch defines an aperture. The bolt is inserted through the aperture defined in each of the lateral portions of the mount and the aperture defined in the latch.

The mount includes an intermediate portion formed between the lateral portions. A spring is arranged between the intermediate portion of the mount and the latch for retaining the latch in the engaging position.

The spring is arranged between the intermediate portion of the mount and the first section of the latch.

The spring includes an intermediate section, two curled sections extending from the intermediate section and two rectilinear sections each extending from one of the curled sections.

The intermediate section of the spring is put on the first section of the latch. The bolt is inserted through the curled sections of the spring. The rectilinear sections of the spring abut the intermediate portion of the mount.

The latch includes two collars formed on two opposite sides and the aperture defined in the latch extends through the collars.

Each of the curled sections of the spring is mounted on one of the collars.

The latch includes a first section for engagement with the rod and a second section to be operated so as to move the latch between the engaging and releasing positions.

The rod includes a series of teeth. The first section of the latch includes at least one tooth formed thereon for engagement with at least one of the teeth formed on the rod in the engaging position.

The first section of the latch may include a plurality of teeth.

The first tube includes two parallel strips formed thereon and the second tube is pivotally connected with the strips.

The support apparatus includes a shaft. Each of the strips defines an aperture. The second tube defines two apertures. The shaft is inserted through the apertures defined in the strips and second tube.

The support apparatus includes a spring and a button with a dome and an annular flange formed around the dome. The second tube defines an aperture. One of the strips defines an aperture. The spring and the button are received in the second tube so that the spring causes the dome of the button to extend through the aperture until the annular flange of the button abuts an internal side of the second tube.

The strip in which the aperture is defined is deformed so as to form a guide for pushing the dome of the button into the aperture while the dome of the button slides on the guide.

The support apparatus may include a holder for a front fork of a bicycle and another holder for a front wheel of the bicycle.

Other objects, advantages, and novel features of the invention will become more apparent from the following detailed description when taken in conjunction with the attached drawings.

BRIEF DESCRIPTION OF DRAWINGS

The present invention will be described through detailed illustration of embodiments referring to the attached drawings wherein.

DETAILED DESCRIPTION OF PREFERRED EMBODIMENT

Figure 1:
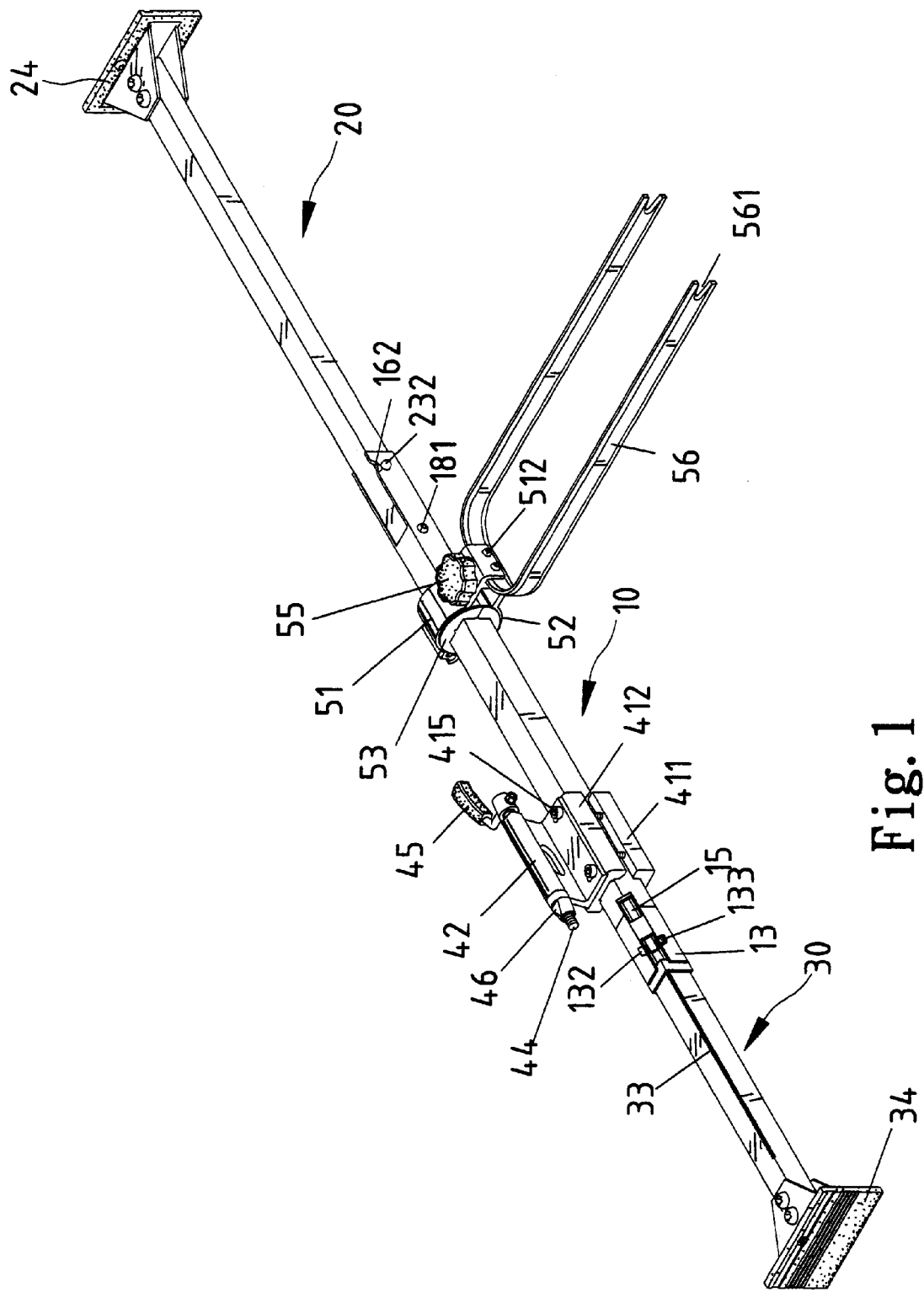
FIG. 1 is a perspective view of a support apparatus according to the present invention.

Referring to the drawings, a support apparatus according to the preferred embodiment of the present invention includes a first tube 10, a second tube 20 pivotally connected with the first tube 10 and a rod 30 telescopically inserted in the first tube 10.

Figure 2:
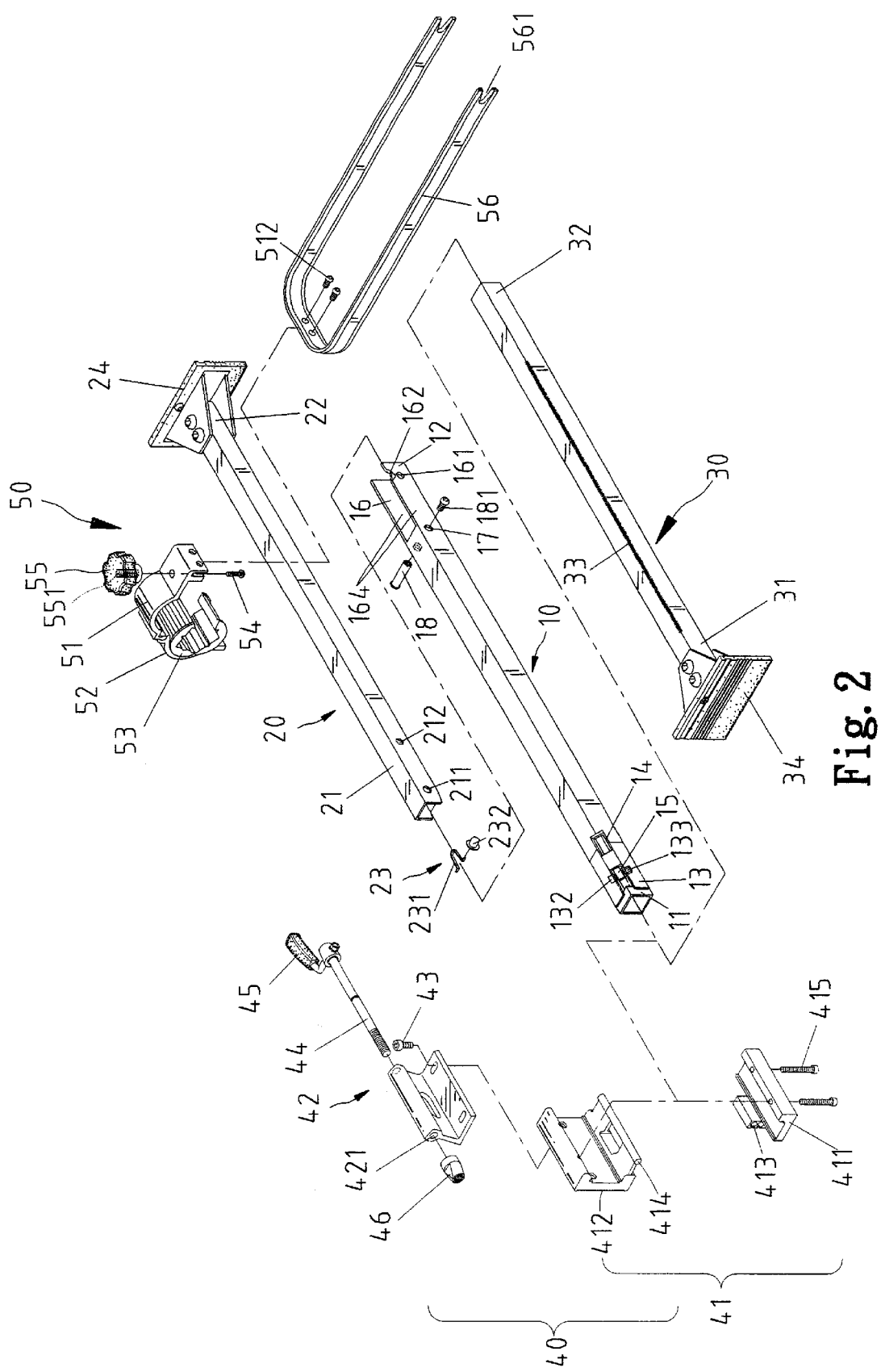
FIG. 2 is an exploded view of the apparatus shown in FIG. 1.

Referring to FIGS. 1 and 2, the first tube 10 is formed with a first end 11 and a second end 12. The rod 30 can be inserted into the first tube 10 through the end 11. A positioning device is installed on the first tube 10 near the first end 11 in order to retain the rod 30 in position relative to the first tube 10.

Figure 3:
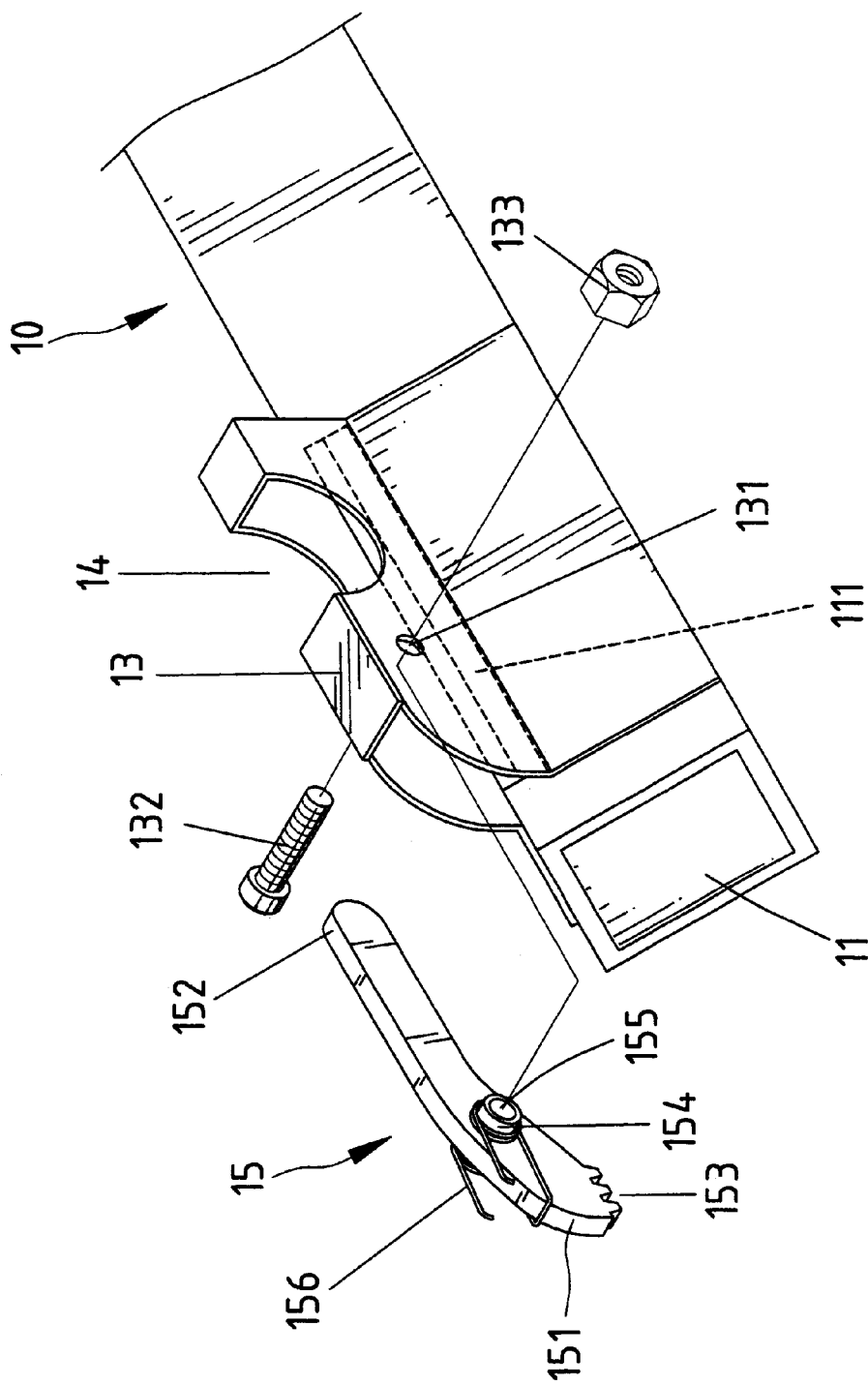
FIG. 3 is a perspective view of a latch for use in the support apparatus shown in FIG. 1.

Further referring to FIG. 3, the positioning device includes a slot 111 defined in the first tube 10 near the first end 11. The positioning device includes a mount 13 secured to the first tube 10 and a latch 15 mounted on the mount 13. The mount 13 includes two lateral portions secured to the first tube 10 and an intermediate portion formed between the lateral portions. The slot 111 is located between the lateral portions of the mount 13. The lateral portions of the mount 13 both define an aperture 131. A cutout 14 is defined in the mount 13.

The latch 15 is formed with a first section 151 and a second section 152. The first section 151 of the latch 15 is formed with a plurality of teeth 153. The latch 15 includes two collars 154 formed on two opposite sides. A tunnel 155 is defined through the latch 15 and the collars 154.

A spring 156 includes an intermediate section, two curled sections (not numbered) extending from the intermediate section and two rectilinear sections (not numbered) each extending from one of the curled sections.

In assembly, the intermediate section of the spring 156 is put on the first section 151 of the latch 15. Each of the curled sections of the spring 156 is mounted on one of the collars 154. The latch 15 is located between the lateral portions of the mount 13. A bolt 132 is inserted in the apertures 131 and the tunnel 155, thus pivotally mounting the latch 15 on the mount 13. The mounting of the latch 15 on the mount 13 is ensured via engagement of the bolt 132 with a nut 133. The rectilinear sections of the spring 156 abut the intermediate portion of the mount 13, thus biasing the first section 151 of the latch 15 away from the intermediate portion of the mount 13.

The rod 30 includes a first end 31, a second end 32 and a series of teeth 33 formed thereon. An abutment element 34 is secured to the first end 31 of the rod 30.

Figure 5:
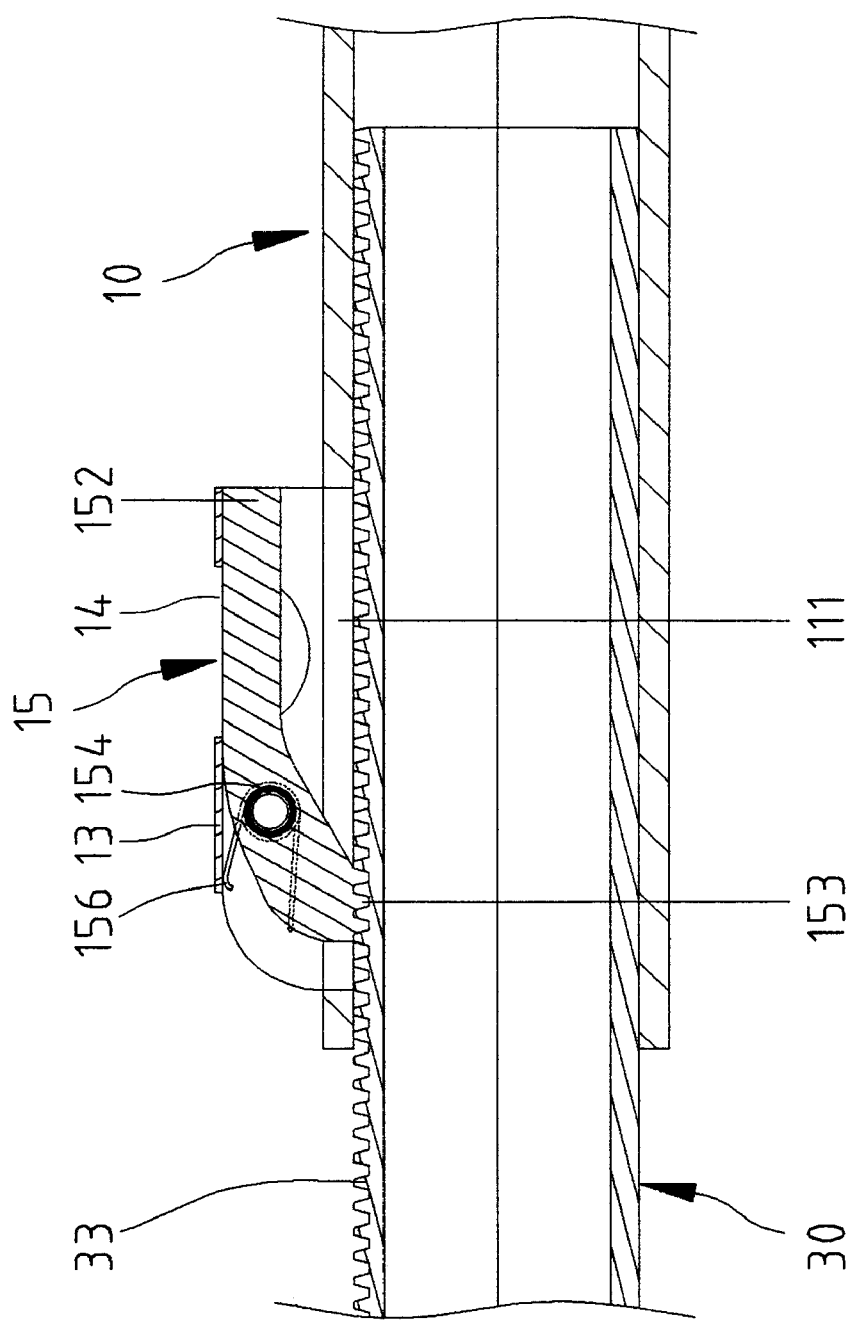
FIG. 5 is a cross-sectional view showing how the latch works.

Referring to FIG. 5, in assembly, the rod 30 is inserted in the first tube 10 so that the teeth 153 formed on the latch 15 can be engaged with some of the teeth 33 formed on the rod 30. Through the cutout 14, the second section 152 of the latch 15 can be pressed so as to remove the teeth 153 formed on the latch 15 from the teeth 33 formed on the rod 30 so that the rod 30 can be moved relative to the first tube 10. When the second section 152 of the latch 15 is released, the spring 153 forces the teeth 153 into engagement with some of the teeth 33 formed on the rod 30, thus retaining the rod 30 in position relative to the first tube 10.

Referring to FIG. 2, the first tube 10 is formed with two parallel strips 164 at the second end 12. A space 16 is defined between the strips 164. A guide 162 is formed by deforming an edge of one of the strips 164 in an outward direction. An aperture 161 is defined in one of the strips 164. An aperture 17 is defined in each of the strips 164.

The second tube 20 includes a first end 21 and a second end 22. An aperture 212 is defined in the second tube 20 near the first end 21. Two apertures 211 are defined in the second tube 20 near the first end 21. An abutment element 24 is secured to the second end 22 of the second tube 20.

A positioning device 23 is advised to lock the first tube 10 in an in-line position relative to the second tube 20. The positioning device 23 includes a spring 231 and a button 232. The button 232 includes a dome and an annular flange formed around the dome. The dome of the button 232 is inserted through the aperture 212 until the annular flange of the button 232 abuts an internal side of the second tube 20. The spring 231 is received in the second tube 20 so that an end thereof is inserted in the dome of the button 232.

In assembly, the first end 22 of the second tube 20 is located between the strips 164. A hollow shaft 18 is inserted in the apertures 17 and 211, thus pivotally connecting the second tube 20 with the first tube 10. The connection of the first tube 10 with the second tube 20 is ensured via engagement of the hollow shaft 18 with a bolt 181.

Figure 4:
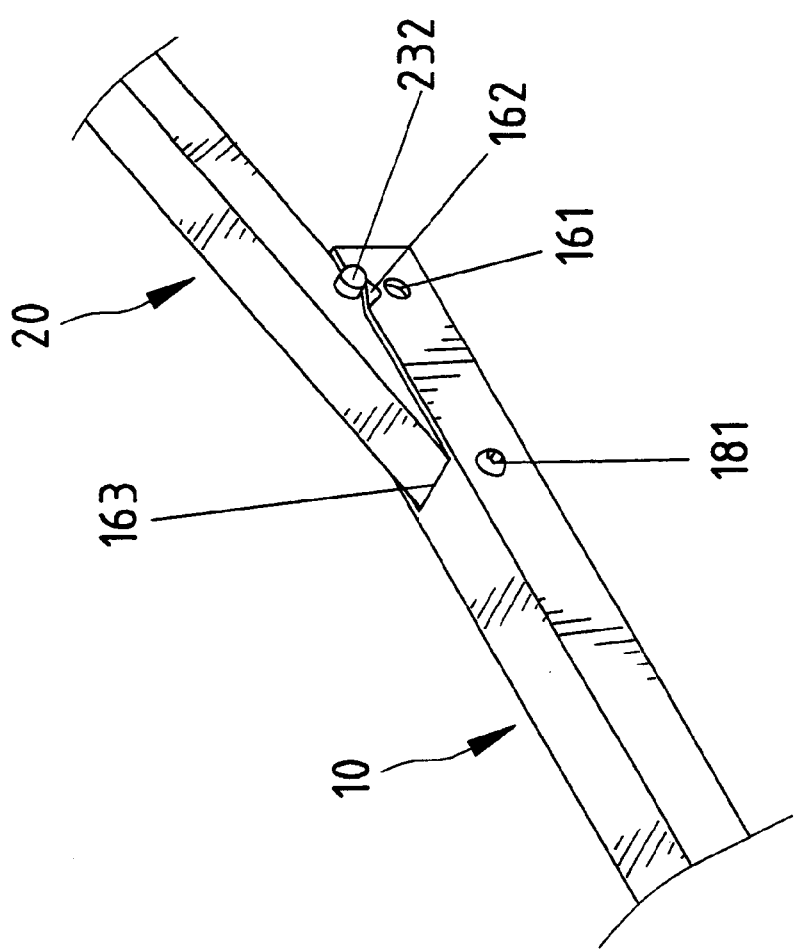
FIG. 4 is a perspective view of a joint for use in the support apparatus shown in FIG. 1.

FIG. 4 shows the second tube 20 in a non-linear position relative to the first tube 10. The second tube 20 contacts an edge 163 of the first tube 10. The dome of the button 232 is positioned against the guide 162. An adequate torque can be exerted on the second tube 20 so that the guide 162 pushes the dome of the button 232 into the aperture 212 while the dome of the button 232 slides on the guide 162. The second tube 20 can be pivoted clockwise relative to the first tube 10 until the spring 231 forces the dome of the button 232 into the aperture 161.

Figure 6:
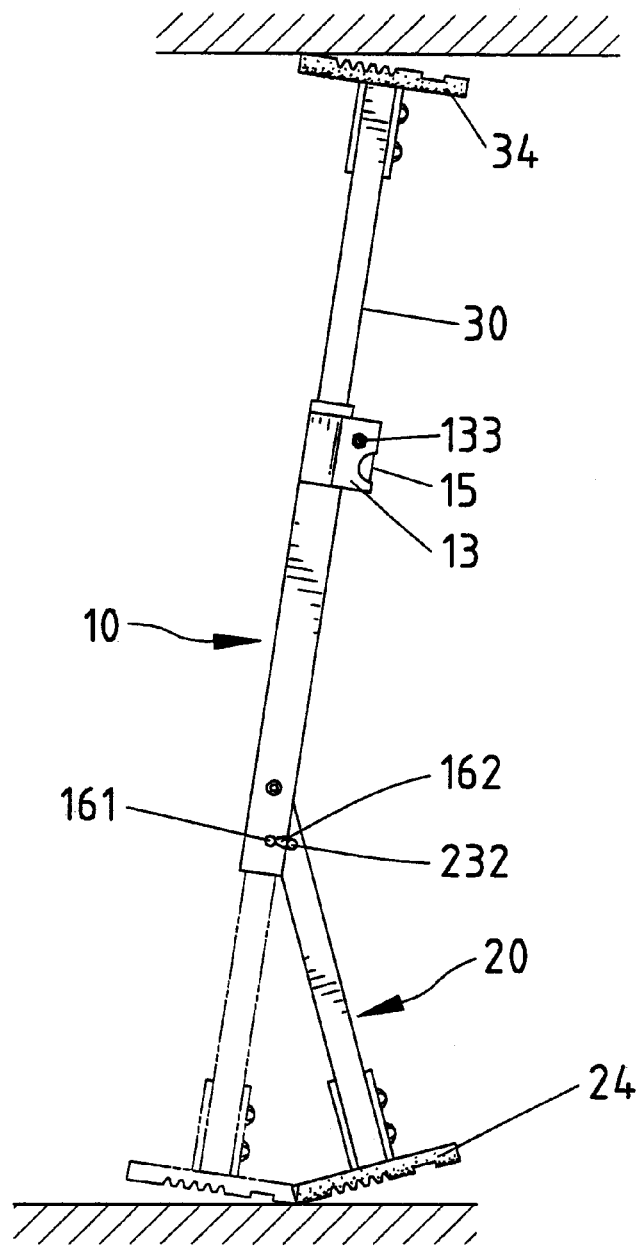
FIG. 6 is an elevation of the support apparatus shown in FIG. 1.

FIG. 6 shows how to install the support apparatus between a floor and a ceiling. As shown in solid lines, the second tube 20 is put in the non-linear position relative to the first tube 10, and the rod 30 is put in an appropriate position relative to the first tube 10 so that the entire length of the support apparatus is marginally greater than the distance between the floor and the ceiling. Then, an adequate torque can be exerted on the second tube 20 so as to pivot it to a linear position relative to the first tube 10 as shown in phantom lines. The abutment elements 24 and 34 are made elastic so as to allow movement of the support apparatus from the non-linear position to the linear position and to ensure tight engagement of the abutment element 24 with the floor and tight engagement of the abutment element 34 with the ceiling.

Figure 7:
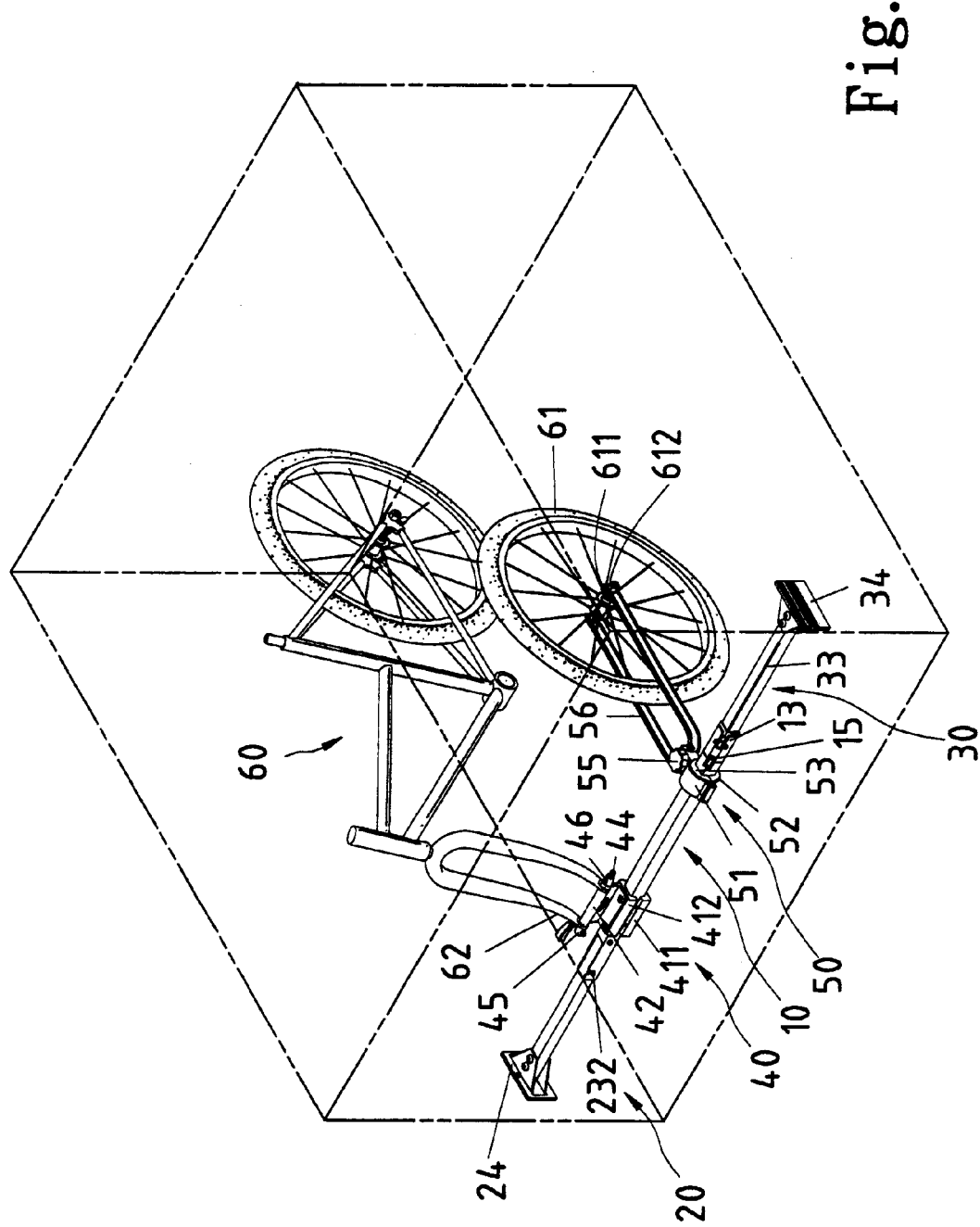
FIG. 7 is a perspective view of a dismantled bicycle supported by means of the support apparatus shown in FIG. 1.

FIG. 7 shows the support apparatus holding a bicycle 60 in a vehicle as shown in phantom lines. To this end, the support apparatus is equipped with a holder 40 for a front fork 62 of the bicycle 60 and a holder 50 for a front wheel 61 of the bicycle 60.

Referring to FIGS. 1 and 2, the holder 40 includes a clamp 41 for holding on to the first tube 10 and a seat 42 secured to the clamp 41 in order to hold the front fork 62. The clamp 41 includes a first claw 411 and a second claw 412. The first claw 411 is pivotally connected with the second claw 412 by means of a hinge (not numbered). The hinge consists of two tunnels 413 defined in a lug 416 extending from the first claw 411 and a shaft 414 extending from the second claw 412. The shaft 414 can be inserted in one of the tunnels 413. The clamp 41 can be opened in order to receive the first tube 10. Two bolts 415 are used to tightly engage the first claw 411 with the second claw 412, thus causing the clamp 41 to tightly clamping the first tube 10.

The seat 42 includes a first portion secured to the second claw 412 by means of at least one bolt 43 and a second portion in which a tunnel 421 is defined. A bolt 44 is inserted through the tunnel 421 for engagement with a nut 46. The bolt 44 can be easily rotated via operation of a lever 45 secured thereto.

The holder 50 includes a clamp (not numbered) for holding on to the first tube 10 and a U-shaped element 56 secured to the clam thereof for supporting the front wheel 61.

The holder 50 consists of a first claw 51 and a second claw 52 pivotally connected with the first claw 51. Thus, the clamp of the holder 50 can be opened to receive the first tube 10. An elastic lining 53 is provided between the first tube 10 and the clamp of the holder 50 in order to ensure tight engagement of the first tube 10 with the clamp of the holder 50. The claws 51 and 52 are tightly engaged with each other by means of a bolt 54 engaged with a nut 551 integrated with a knob 55.

The U-shaped element 56 is secured to the first claw 51 by means of two bolts 512. The U-shaped element 56 includes two prongs each including a bifurcate end 561.

Referring to FIG. 7, the front fork 62 of the bicycle 60 is mounted on the bolt 44 functioning similar to a shaft of a wheel. The lever 45 can be operated in order to tighten the engagement of the bolt 44 with the nut 46 in order to hold the front fork 62 of the bicycle 60. The front wheel 61 includes a shaft 611. The shaft 611 is mounted on the bifurcate ends 561 of the U-shaped element 56. Two nuts 612 can be engaged with the ends of the shaft 611, thus securely mounting the shaft 611 of the front wheel 61 of the bicycle 60 on the U-shaped element 56.

The present invention has been described through detailed illustration of the preferred embodiment. Those skilled in the art can derive many variations from the preferred embodiment without departing from the scope of the present invention. Therefore, the preferred embodiment shall not limit the scope of the present invention. The scope of the present invention is defined in the attached claims.

What is claimed is:

1. A support apparatus for engagement between a pair of spaced support surfaces, comprising:
    a longitudinally extended first tube (10) having a first end (11) and an opposing second end (12);
    a longitudinally extended second tube (20) having a first end (21) and an opposing second end (22), the first end (21) of the second tube (20) being pivotally connected with the second end (12) of the first tube (10), the second end (22) of the second tube (20) having a first abutment element (24) secured thereto;
    a first positioning device (23) for locking the second tube (20) in a longitudinal in-line position relative to the first tube (10);
    a longitudinally extended rod (30) having a first end (31) and an opposing second end (32), the first end (31) of the rod (30) having a second abutment element (34) secured thereto, the second end (32) of the rod (30) being telescopically connected with the first end (11) of the first tube (10); and,
    a second positioning device for locking the rod (30) in position relative to the first tube (10), wherein the second abutment element (34) is positioned to abut one support surface and the second tube (20) is pivoted to the locking position to bring the first abutment element (24) into tight engagement with the other support surface.

2. The support apparatus according to claim 1 wherein the second positioning device includes a mount (13) secured to the first tube (10) and a latch (15) movably mounted on the mount (13) between an engaging position where the latch (15) engages with the rod (30) and a releasing position where the latch (15) releases the rod (30).

3. The support apparatus according to claim 2 wherein the mount (13) includes two lateral portions secured to the first tube (10), and the latch (15) is pivotally mounted on the lateral portions of the mount (13).

4. The support apparatus according to claim 3 including a bolt (132), wherein each of the lateral portions of the mount (13) has an aperture (131) formed therethrough, and the latch (15) has an aperture (155) formed therethrough, and the bolt (132) is inserted through the aperture (131) formed in each of the lateral portions of the mount and the aperture (155) formed in the latch (15).

5. A support apparatus for engagement between a pair of spaced support surfaces, comprising:
    a first tube (10);
    a second tube (20) pivotally connected with the first tube (10);
    a first positioning device (23) for locking the second tube (20) in an in-line position relative to the first tube (10);
    a rod (30) telescopically connected with the first tube (10);
    a second positioning device for locking the rod (30) in position relative to the first tube (10), the second positioning device including a mount (13) secured to the first tube (10) and a latch (15) movably mounted on the mount (13) between an engaging position where the latch (15) engages with the rod (30) and a releasing position where the latch (15) releases the rod (30), the mount (13) including two lateral portions secured to the first tube (10), and the latch (15) is pivotally mounted on the lateral portions of the mount (13);
    a bolt (132), each of the lateral portions of the mount (13) having an aperture (131) formed therethrough and the latch (15) having an aperture (155) formed therethrough, the bolt (132) being inserted through the apertures (131) of the mount (13) and the aperture (155) of the latch (15); and,
    a spring (156), the mount (13) including an intermediate portion formed between the lateral portions, the spring (156) being arranged between the intermediate portion of the mount (13) and the latch (15) for locking the latch (15) in the engaging position.

6. The support apparatus according to claim 5 wherein the spring (156) is arranged between the intermediate portion of the mount (13) and the latch (15).

7. The support apparatus according to claim 6 wherein the spring (156) includes an intermediate section, two curled sections extending from the intermediate section and two rectilinear sections each extending from one of the curled sections.

8. The support apparatus according to claim 7 wherein the intermediate section of the spring (156) is put on the latch (15), and the bolt (132) is inserted through the curled sections of the spring (15), and the rectilinear sections of the spring (156) abut the intermediate portion of the mount (13).

9. The support apparatus according to claim 8 wherein the latch (15) includes two collars (154) formed on two opposite sides and the aperture (155) of the latch (15) and the bolt (132) extends through the collars (154).

10. The support apparatus according to claim 9 wherein each of the curled sections of the spring (156) is mounted on one of the collars (154).

11. The support apparatus according to claim 2 wherein the latch (15) includes a first section (151) for engagement with the rod (30) and a second section (152) for operation to move the latch (15) between the engaging and releasing positions.

12. The support apparatus according to claim 11 wherein the rod (30) includes a series of teeth (33) and the first section (151) of the latch (15) includes at least one tooth (153) formed thereon for engagement with at least one of teeth (33) formed on the rod (33) in the engaging position.

13. The support apparatus according to claim 12 wherein the first section (151) of the latch (15) includes a plurality of teeth (153).

14. The support apparatus according to claim 1 wherein the first tube (10) includes two parallel strips (164) formed thereon and the second tube (20) is pivotally connected with the strips (164).

15. The support apparatus according to claim 14 including a shaft (18) wherein each of the strips (164) defines an aperture (17), and the second tube (20) defines two apertures (211), and the shaft (18) is inserted through the apertures (17, 211) defined in the strips and second tube (164, 20).

16. The support apparatus according to claim 15 including a spring (231) and a button (232) with a dome and a flange formed around the dome, wherein the second tube (20) defines an aperture (212), and one of the strips (164) defines an aperture (161), and the spring (231) and the button (232) are received in the second tube (20) so that the spring (231) causes the dome of the button (232) to extend through the aperture (212) until the flange of the button (232) abuts an internal side of the second tube (20).

17. The support apparatus according to claim 16 wherein the strip (164) in which the aperture (161) is defined is deformed so as to form a guide (162) for pushing the dome of the button (232) into the aperture (212) while the dome of the button (232) slides on the guide (162).

18. The support apparatus according to claim 1 including a holder (40) for a front fork (62) of a bicycle (60).

19. A support apparatus for engagement between a pair of spaced support surfaces, comprising:

a first tube (10);

a second tube (20) pivotally connected to one end of the first tube (10);

a rod (30) telescopically connected to an opposing end of the first tube (10); and a positioning device for locking the second tube (20) in a longitudinal in-line position relative to the first tube (10)

including:

(a) a latch (15) pivotally mounted on the first tube (10) between an engaging position for engagement with the rod (30) and a releasing position for release of the rod (30); and (b) a spring (156) for biasing the latch (15) into the engaging position;

wherein a distal end of the rod (30) is positioned to abut one support surface and the second tube (20) is pivoted to the in-line position to bring a distal end of the second tube (20) into tight engagement with the other support surface.

20. The support apparatus according to claim 19 wherein the spring (156) is a torque spring.

* * * * *